US012697830B2

(12) United States Patent
Ohira

(10) Patent No.: US 12,697,830 B2
(45) Date of Patent: Aug. 4, 2026

(54) PRINTING APPARATUS AND CONTROL METHOD OF PRINTING APPARATUS

(71) Applicant: CANON KABUSHIKI KAISHA, Tokyo (JP)

(72) Inventor: Yuki Ohira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 18/544,029

(22) Filed: Dec. 18, 2023

(65) Prior Publication Data

US 2024/0198706 A1 Jun. 20, 2024

(30) Foreign Application Priority Data

Dec. 20, 2022 (JP) ................................ 2022-203304

(51) Int. Cl.
*B41J 29/393* (2006.01)
*B41J 11/00* (2006.01)

(52) U.S. Cl.
CPC ........... *B41J 29/393* (2013.01); *B41J 11/002* (2013.01); *B41J 2203/01* (2020.08)

(58) Field of Classification Search
CPC .... B41J 29/393; B41J 11/002; B41J 2203/01; B41J 11/00222; G03G 15/2007; G03G 15/2046; G03G 15/6594
See application file for complete search history.

(56) References Cited

FOREIGN PATENT DOCUMENTS

| | | | | |
|---|---|---|---|---|
| CN | 1873560 A | * 12/2006 | ......... | G03G 15/2064 |
| JP | 2017140782 A | 8/2017 | | |

* cited by examiner

*Primary Examiner* — Justin Seo
(74) *Attorney, Agent, or Firm* — Canon U.S.A., Inc. IP Division

(57) ABSTRACT

A printing apparatus includes a first determining unit configured to determine a conveyance profile corresponding to a print mode, a conveying unit configured to convey a printing medium on which on an image is printed, according to the conveyance profile, a fixing unit configured to fix the image onto the printing medium by heating the printing medium, a measuring unit configured to measure each of a length of the printing medium before heating in the fixing unit and a length of the printing medium after the heating by detecting the image on the printing medium conveyed according to the conveyance profile, a deriving unit configured to derive a characteristic of a deformation amount of the printing medium with respect to temperature based on the measured lengths, and a second determining unit configured to determine a fixation temperature to be used for the printing medium based on the derived characteristic.

15 Claims, 12 Drawing Sheets

| NUMBER OF FORWARDING OPERATIONS PER ONE HEAD LENGTH | ONE FORWARDING OPERATION | TWO FORWARDING OPERATIONS | FOUR FORWARDING OPERATIONS |
|---|---|---|---|
| CONVEYANCE AMOUNT PER ONE FORWARDING OPERATION | 1inch | 0.5inch | 0.25inch |
| MAXIMUM SPEED | 5ips | 5ips | 2.5ips |
| ACCELERATION | 50inch/s$^2$ | 50inch/s$^2$ | 50inch/s$^2$ |

| TEMPERATURE[℃] | INTER-PATTERN LENGTH[mm] | DEFORMATION AMOUNT[%] |
|---|---|---|
| 20℃ | 200.0 mm | 0.00 % |
| 80℃ | 199.8 mm | -0.10 % |
| 100℃ | 198.9 mm | -0.55 % |

FIG.9

FIG.10A
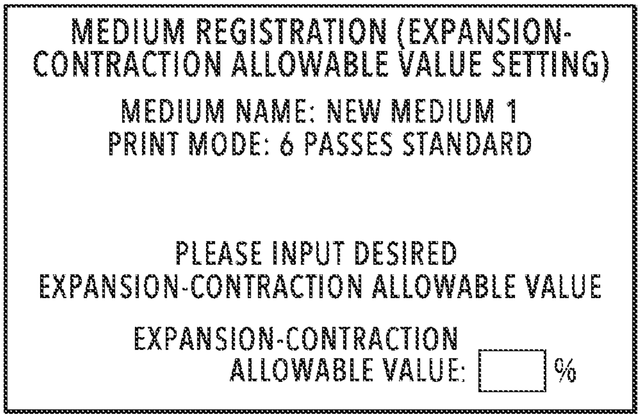
FIG.10B
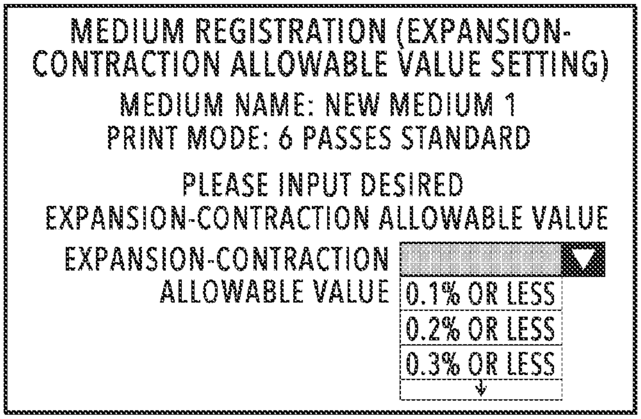
FIG.10C
| PRINTING MEDIUM TYPE | DEFORMATION AMOUNT THRESHOLD |
|---|---|
| TARPAULIN | 0.3% |
| VINYL CHLORIDE SHEET WITH RELEASE PAPER | 0.1% |
| PET FILM | 0.2% |
FIG.10D
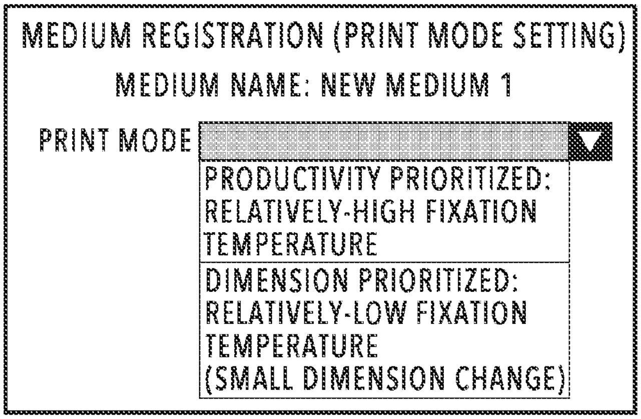

FIG.10E
| PRINT MODE | DEFORMATION AMOUNT THRESHOLD |
|---|---|
| PRODUCTIVITY PRIORITIZED MODE | 0.3% |
| DIMENSION PRIORITIZED MODE | 0.1% |
FIG.10F
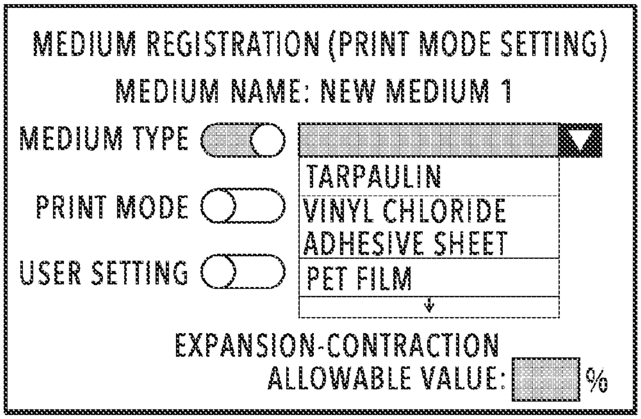
FIG.10G
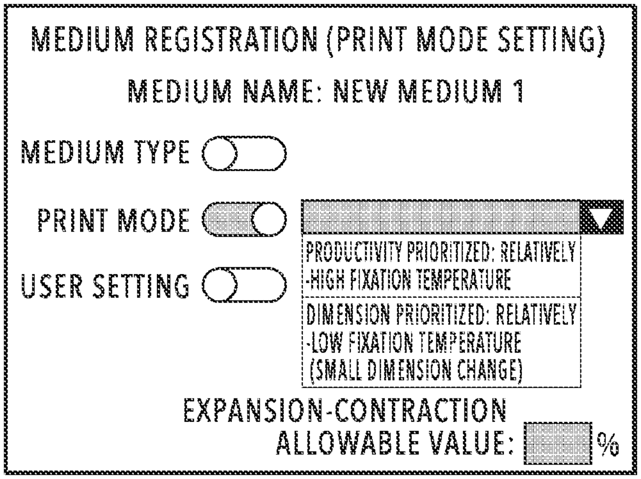
FIG.10H
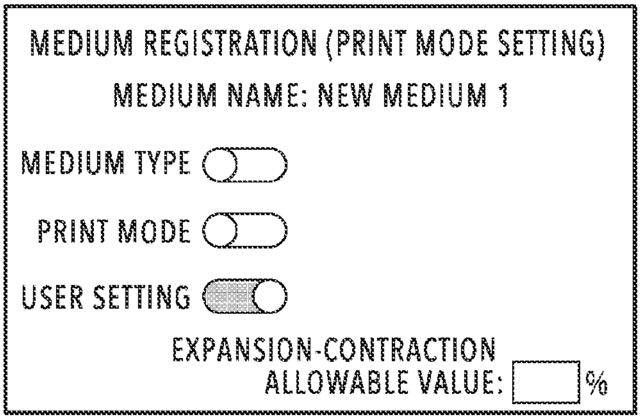

PRINTING APPARATUS AND CONTROL METHOD OF PRINTING APPARATUS

BACKGROUND

Field of the Disclosure

The present disclosure relates to a printing apparatus including a fixing unit configured to fix a printed image with heat and a control method of the same.

Description of the Related Art

Among printing apparatuses configured to form an image by applying ink to a printing medium, there is a printing apparatus configured to fix the image by performing a heating process on the printing medium. In such a heating process, increasing an amount of heat applied to the printing medium promotes evaporation of a solvent included in the ink, melting of a resin, and film formation, and the image tends to be fixed more surely in a shorter time.

However, depending on the heating temperature, there may occur a case where a molecular structure of the printing medium changes and the printing medium is deformed. Accordingly, it is preferable to adjust the amount of heating to a level at which no deformation of the printing medium occurs and preferable fixation is achieved. However, such a preferable amount of heating depends on a material of the printing medium. Moreover, the heat capacity of the printing medium varies depending on the thickness or size of the printing medium, even in the case of the same material. Accordingly, the printing apparatus configured to perform heating fixation is required to optimize the heating process depending on the printing medium to be used, that is to set an optimal heating temperature for each type of printing medium.

Japanese Patent Laid-Open No. 2017-140782 (hereinafter, referred to as Literature 1) discloses a technique as follows. A deformation amount of a printing medium is measured while changing a fixation temperature stepwise to obtain the deformation amount at each step of the fixation temperature, the deformation amount with respect to temperature is predicted, and whether the deformation amount has exceeded a deformation amount threshold defined in advance is determined.

However, depending on a conveyance method in the measurement of the deformation amount, a prediction accuracy of the deformation amount with respect to temperature decreases, and an optimal fixation temperature cannot be determined in some cases. For example, in the case where a conveyance profile in the deformation amount measurement before that heating and that after the heating vary, the deformation amount measurement value is affected by variations in conveyance behaviors. Accordingly, there is a possibility that the optimal fixation temperature cannot be determined.

SUMMARY

A printing apparatus according to one aspect of the present disclosure includes a printing unit configured to print an image onto a printing medium, a first determining unit configured to determine a conveyance profile corresponding to a print mode, a conveying unit configured to convey a printing medium on which on an image is printed, according to the conveyance profile, a fixing unit configured to fix the image onto the printing medium by heating the printing medium, a measuring unit configured to measure each of a length of the printing medium before heating in the fixing unit and a length of the printing medium after the heating in the fixing unit by detecting the image on the printing medium conveyed according to the conveyance profile, a deriving unit configured to derive a characteristic of a deformation amount of the printing medium with respect to temperature based on the measured lengths, and a second determining unit configured to determine a fixation temperature to be used for the printing medium based on the derived characteristic of the deformation amount of the printing medium.

Further features of the present disclosure will become apparent from the following description of exemplary embodiments with reference to the attached drawings.

BRIEF DESCRIPTION OF THE DRAWINGS

FIG. 9 is a diagram illustrating an example of measured inter-pattern lengths and deformation amounts;

FIGS. 10A to 10H are diagrams illustrating examples in which a deformation amount threshold can be selected.

DESCRIPTION OF THE EMBODIMENTS

Figure 1A:
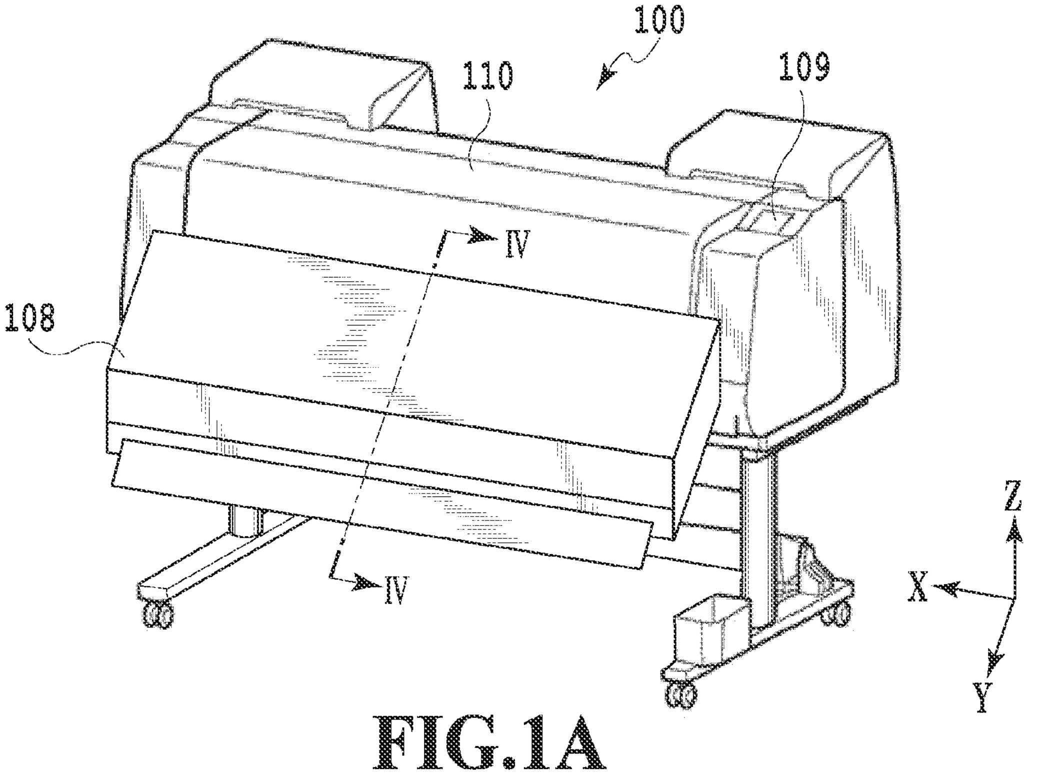
FIGS. 1A and 1B are perspective diagrams illustrating a configuration of a printing apparatus.

Embodiments of the present disclosure are described below in detail with reference to the attached drawings. Note that the following embodiments do not limit the matters of the present disclosure, and not all of the combinations of features described in the following embodiments are necessarily essential for the solving means of the present disclosure. Note that the same constituent elements are denoted by the same reference numerals.

First Embodiment

<Overall Configuration>

Figure 1B:
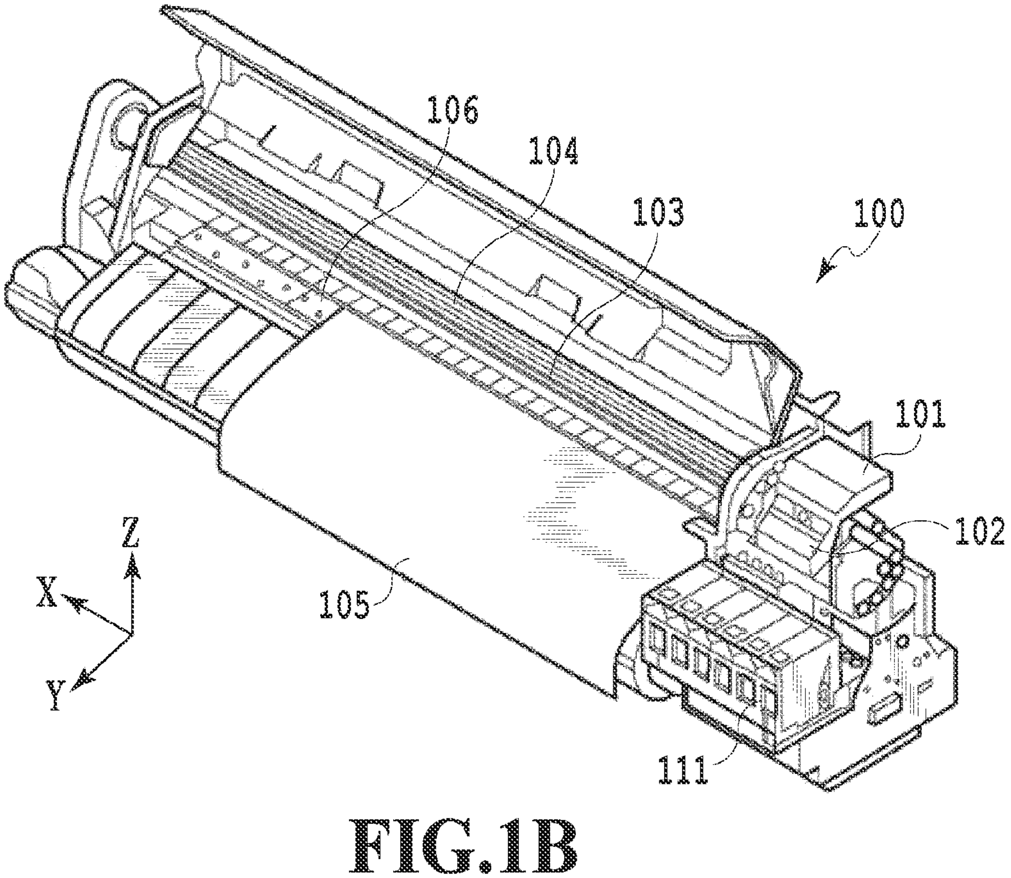

FIGS. 1A and B are perspective diagrams illustrating a configuration of a printing apparatus 100. FIG. 1A is a diagram illustrating an outer appearance of the entire printing apparatus 100. FIG. 1B is a diagram illustrating a state where an upper cover 110 in FIG. 1A is opened and an inner structure is viewable. The printing apparatus 100 in the present embodiment performs printing by applying ink droplets, as a printing agent, on a printing medium 105 by an inkjet printing method. The printing medium 105 is conveyed with a conveyance direction being a Y direction.

A carriage 101 in which a print head 102 is mounted performs printing by reciprocally moving in an X direction intersecting the Y direction. Specifically, the printing apparatus 100 is an inkjet printing apparatus including a so-called serial type print head. However, there may be used an inkjet printing apparatus including a so-called line type print head in which nozzle arrays are formed over a print swath in the conveyance direction of the printing medium. Moreover, the printing apparatus 100 may be a multifunction peripheral in which functions such as a scan function, a FAX function, or a transmission function are integrated. Moreover, the printing apparatus 100 may be a printing apparatus of an electrophotographic method that uses a powder toner as the printing agent. In the present embodiment, a function of a process in which fixing condition setting to be described later is performed is installed in the printing apparatus 100.

The printing apparatus 100 includes an input/output unit 109 in an upper portion. The input/output unit 109 is formed of, for example, an operation panel. Specifically, the input/output unit 109 includes a display that can display an ink remaining amount, candidates of a type of printing medium, and the like. The user can select the type of the printing medium and perform setting of printing by operating keys on the operation panel.

The carriage 101 includes an optical sensor 201 (FIG. 2) and the print head 102 in which an ejection port surface provided with ejection ports for ejecting ink supplied from an ink tank 111 is formed. The carriage 101 is configured to reciprocally move in the X direction (movement direction of the carriage) along a shaft 104, by drive of a carriage motor 515 (FIG. 5) via a carriage belt 103. In the present embodiment, the printing apparatus 100 can detect reflected light from a surface of the printing medium 105 by using the optical sensor 201.

The printing medium 105, such as a roll paper, is conveyed by a not-illustrated conveyance roller in the Y direction on a platen 106. Note that, as described later, the printing medium 105 can be conveyed in the conveyance direction and the opposite direction to the conveyance direction by the conveyance roller. The carriage 101 performs a printing operation by ejecting ink droplets from the print head 102 while moving in the X direction above the printing medium 105 conveyed onto the platen 106 by the conveyance roller. In the case where the carriage 101 moves to an end of a printing region on the printing medium 105, the conveyance roller conveys the printing medium 105 by a certain amount, and moves the printing medium 105 to such a position that the print head 102 can perform printing on a region to be subjected to next print scanning. The above operation is repeatedly performed to print an image. The ink used in image printing in the present embodiment is a latex ink. Applying heat to the ink causes a water content to evaporate and causes a latex resin to melt and mix with a pigment, and a film is formed and cured on the printing medium surface. In the case where a general aqueous ink is used, the printing medium needs to have an ink receiving layer for catching the ink and suppressing bleeding. Meanwhile, the latex printer can perform printing on a printing medium having no ink receiving layer. In the present embodiment, the printing medium 105 subjected to printing is conveyed to a fixing unit 108. The fixing unit 108 is arranged downstream, in the Y direction (conveyance direction), of the printing region in which the print head 102 performs the printing. Heat is applied to the conveyed printing medium 105 in the fixing unit 108, and is discharged from the fixing unit 108 in a state (finished state) where the ink is cured and fixed onto the printing medium.

<Carriage Configuration>

Figure 2:
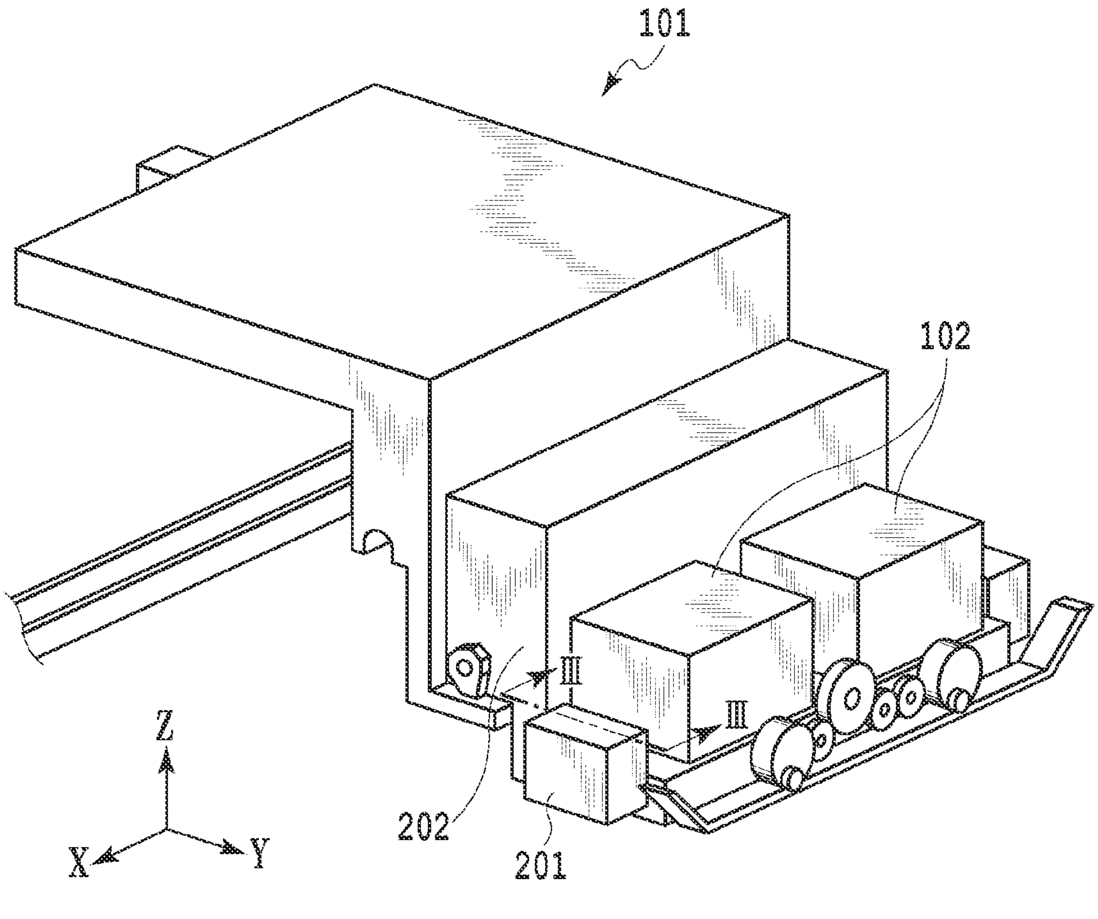
FIG. 2 is a diagram illustrating a configuration of a carriage.

FIG. 2 is a diagram illustrating a configuration of the carriage 101. The carriage 101 includes a head holder 202. The carriage 101 is a unit that can reciprocally move in the width direction (X direction) of the printing medium 105. The head holder 202 is a member that holds the print head 102 and the optical sensor 201 being a reflective sensor. As illustrated in FIG. 2, the position of the optical sensor 201 is configured such that a bottom surface of the optical sensor is at the same position as or slightly above a bottom surface of the print head 102, so as not to come into contact with the printing medium in carriage movement.

<Optical Sensor Configuration>

Figure 3:
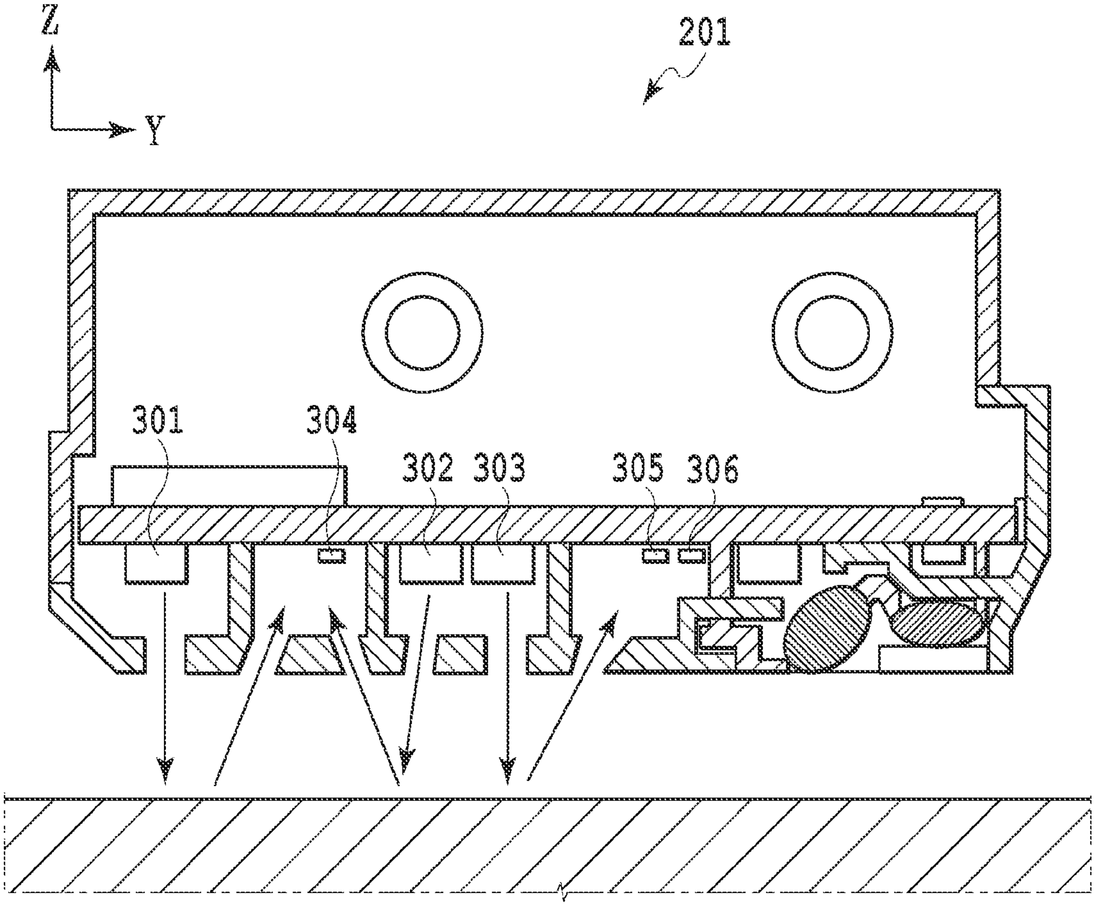
FIG. 3 is a cross-sectional schematic diagram illustrating a configuration of an optical sensor.

FIG. 3 is a cross-sectional schematic diagram illustrating a configuration of the optical sensor 201. FIG. 3 illustrates a cross section along the III-III line in FIG. 2. The optical sensor 201 includes a first LED 301, a second LED 302, a third LED 303, a first photodiode 304, a second photodiode 305, and a third photodiode 306 as optical elements. The first LED 301 is a light source having an angle of irradiation of a normal line (90°) with respect to the surface (measurement surface) of the printing medium 105. The first photodiode 304 receives reflection of light emitted from the first LED 301 and reflected on the printing medium 105, at an angle of 45° in a Z direction. Specifically, the first LED 301 and the first photodiode 304 form an optical system that detects a so-called diffuse-reflection component of the reflected light from the printing medium 105. Although the angle is not limited to 45°, the angle of 45° is preferable in consideration of robustness to fluctuation of the height of the print head 102.

The second LED 302 is a light source having an angle of irradiation of 60° in the Z direction with respect to the surface (measurement surface) of the printing medium 105. The first photodiode 304 receives reflection of light emitted from the second LED 302 and reflected on the printing medium 105, at an angle of 60° in the Z direction. Specifically, the second LED 302 and the first photodiode 304 form an optical system in which an angle of light emission and an angle of light reception are equal and that detects a so-called specular reflection component of the reflected light from the printing medium 105. Although the angle is not limited to 60°, the angle of 60° is preferable in consideration of the size of the optical sensor 201 and an SN ratio of the received light.

The third LED 303 is a light source having an angle of irradiation of a normal line (90°) with respect to the surface (measurement surface) of the printing medium 105. The second photodiode 305 and the third photodiode 306 receive reflection of light emitted from the third LED 303 and reflected on the printing medium 105. Light receiving amounts of the respective second photodiode 305 and third photodiode 306 change depending on a distance between the optical sensor 201 and the printing medium 105. The distance between the optical sensor 201 and the printing medium 105 can be thereby measured.

Although an example in which the optical sensor 201 is installed in the carriage 101 is described in the present embodiment, other forms may be employed. For example, the optical sensor may be installed by being fixed to the printing apparatus 100. Alternatively, there may be employed a form in which a measurement device for measuring characteristics of the printing medium that is separate from the printing apparatus 100 is used, and the characteristics measured by the measurement device are transmitted to the printing apparatus.

<Configuration of Fixing Unit>

Figure 4:
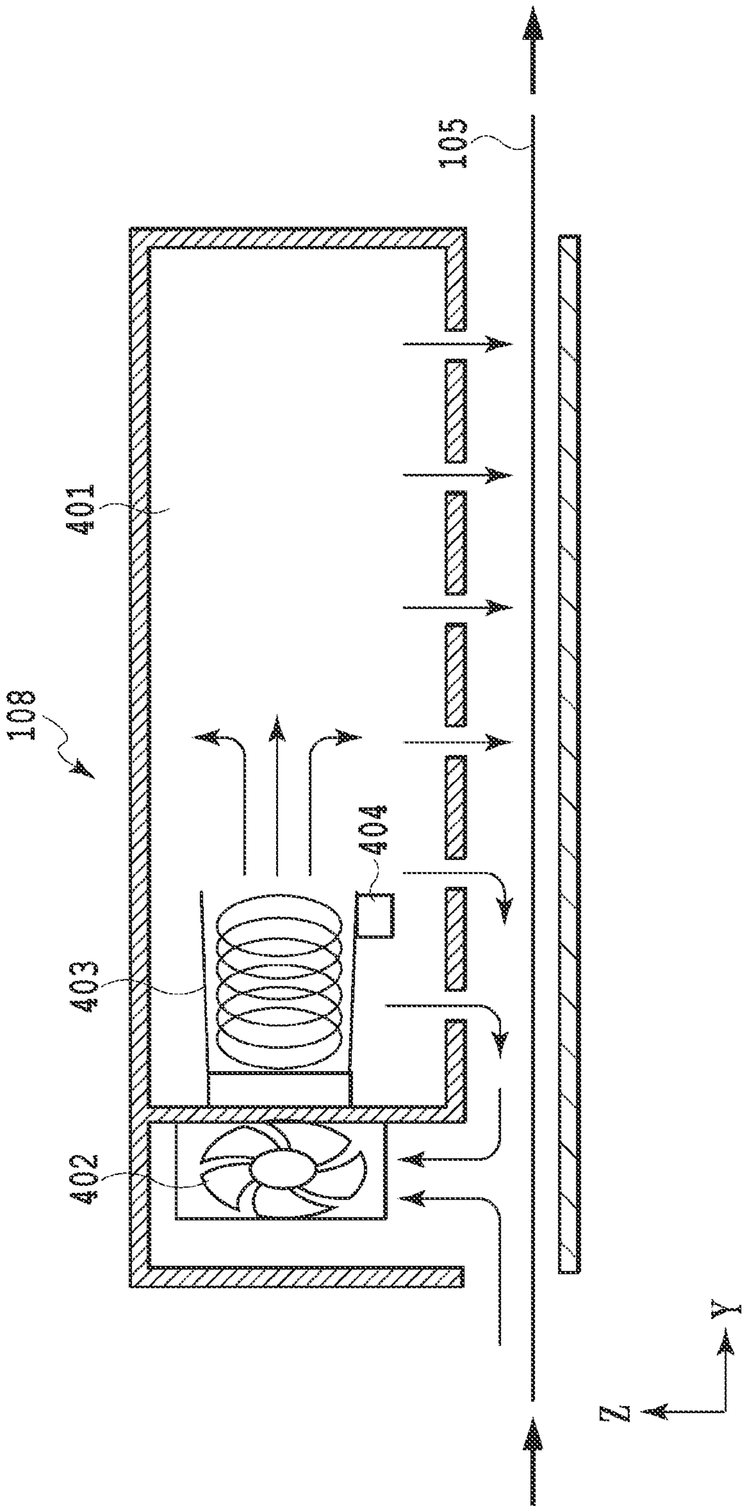
FIG. 4 is a cross-sectional schematic diagram illustrating a configuration of a fixing unit.

FIG. 4 is a cross-sectional schematic diagram illustrating a configuration of the fixing unit 108 for ink fixation. FIG. 4 illustrates a cross section along the IV-IV line in FIG. 1A. The printing medium 105 is assumed to be fed to the fixing unit 108 from the left side of FIG. 4 and discharged to the right side.

An axial-flow air blow fan 402, which takes in outside air and blows the air, and a heater 403, which heats the air blown from the air blow fan 402 to turn the air to dry air, are provided in a chamber 401. The dry air blown from an opening portion of the chamber 401 contributes to the fixation of the ink. A fixation temperature used by the heater 403 can be changed, and is determined to be a heating temperature optimal for the target printing medium 105 based on a flowchart of determining the fixation temperature to be described later. The heater 403 includes a temperature sensor 404. Temperature feedback from the temperature sensor 404 enables more stable heater temperature control. Note that, although a non-contact ink fixing configuration using dry air and achieved by the combination of the air blow fan 402 and the heater 403 is employed in the present example, a configuration using a contact heater or a radiant heater may be employed.

<Block Diagram>

Figure 5:
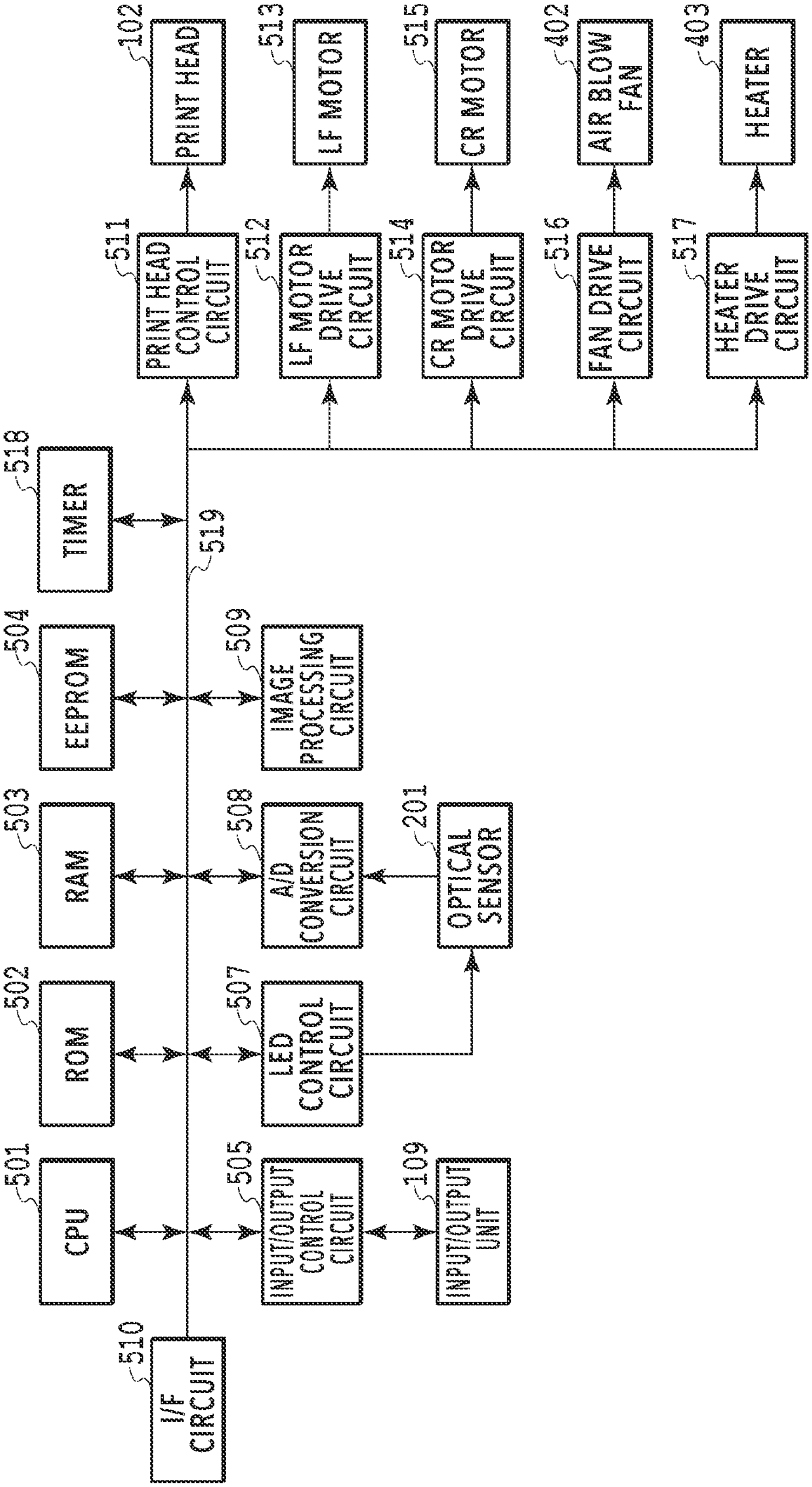
FIG. 5 is a diagram illustrating a block configuration of a control system of the printing apparatus.

FIG. 5 is a diagram illustrating a block configuration of a control system of the printing apparatus 100. A ROM 502 is a non-volatile memory, and stores, for example, a control program for controlling the printing apparatus 100 and a program for implementing operations of the present embodiment. For example, a CPU 501 implements the operations of the present embodiment by reading the program stored in the ROM 502 out to a RAM 503 and executing the program. The RAM 503 is also used as a working memory of the CPU 501. An EEPROM 504 stores data to be held even if power of the printing apparatus 100 is turned off. At least the CPU 501 and the ROM 502 implement functions as an information processing apparatus that executes processes to be described later. The EEPROM 504 stores a characteristic value, a fixing condition, and the like of each printing medium that are defined in advance. The characteristic value and the fixing condition of each printing medium may be stored in a ROM of a host computer or an external memory such as a server, instead of a storage medium in the printing apparatus 100. Moreover, the CPU 501 may perform processes using information stored outside the printing apparatus 100.

An interface (I/F) circuit 510 connects the printing apparatus 100 and an external network, such as an LAN, to each other. The printing apparatus 100 exchanges various jobs, data, and the like with an external apparatus, such as a host computer, by using the I/F circuit 510.

The input/output unit 109 includes an input unit and an output unit. The input unit receives an instruction of power on, an instruction of print execution, and an instruction of setting various functions from the user. The output unit displays various pieces of apparatus information such as a power saving mode and a setting screen of various functions that can be executed by the printing apparatus 100. In the present embodiment, the input/output unit 109 is an operation panel included in the printing apparatus 100. The input/output unit 109 is connected to a system bus 519 via an input/output control circuit 505 capable of exchanging data with the system bus 519. In the present embodiment, the CPU 501 performs notification control of information of the output unit.

Note that the input unit may be a keyboard of an external host computer and be capable of receiving instructions of the user from the external host computer. The output unit may be an LED display, an LCD display, or a display connected to the host apparatus. Moreover, in the case where the input/output unit is a touch panel, the input/output unit can receive instructions from the user through software keys. Moreover, the input/output unit 109 may be formed of a speaker and a microphone and be configured such that an input from the user is a voice input and notification to the user is a voice output.

In the case where the measurement by the optical sensor 201 is to be executed, the CPU 501 drives an LED control circuit 507 to perform control such that a predetermined LED in the optical sensor 201 is turned on. Each of the photodiodes in the optical sensor 201 outputs a signal corresponding to the received light, an A/D conversion circuit 508 converts the signal to a digital signal, and the digital signal is temporarily saved in the RAM 503. Data to be saved also during power off of the printing apparatus 100 is stored in the EEPROM 504.

A print head control circuit 511 supplies a drive signal corresponding to print data to a nozzle drive circuit including a selector and a switch mounted in the print head 102, and performs control of a printing operation of the print head 102 such as drive order of nozzles. For example, in the case where print target data is transmitted from the outside to the I/F circuit 510, the print target data is temporarily saved in the RAM 503. Then, the print head control circuit 511 drives the print head 102 based on print data obtained by converting the print target data to print data for printing. In this case, a line feed (LF) motor drive circuit 512 drives an LF motor 513 based on a bandwidth of the print data or the like, and rotates the conveyance roller connected to the LF motor 513 to convey the printing medium 105. A carriage (CR) motor drive circuit 514 drives a carriage (CR) motor 515 to perform scanning by the carriage 101 via the carriage belt 103.

Data sent from the I/F circuit 510 includes not only the print target data but also data on contents set in a printer driver. Moreover, for example, the print target data is received from the outside via the I/F circuit 510 and stored in a storage unit such as the RAM 503, or is stored in advance in a storage unit such as a hard disk drive in some cases. The CPU 501 reads image data from the storage unit and controls an image processing circuit 509 to perform conversion (binarization process) of the image data to the print data for using the print head 102. The image processing circuit 509 executes various image processes such as color space conversion, HV conversion, gamma correction, and rotation of an image, in addition to the binarization process.

A fan drive circuit 516 controls the air blow amount from the air blow fan 402 by controlling the number of revolutions of the air blow fan 402. A heater drive circuit 517 performs temperature control of the heater 403 based on heater temperature setting information from the CPU 501 and the temperature feedback from the temperature sensor 404 installed near the heater 403. A timer 518 measures heating time by the fixing unit.

<Conveyance Profile>

Figures 6A, 6B:
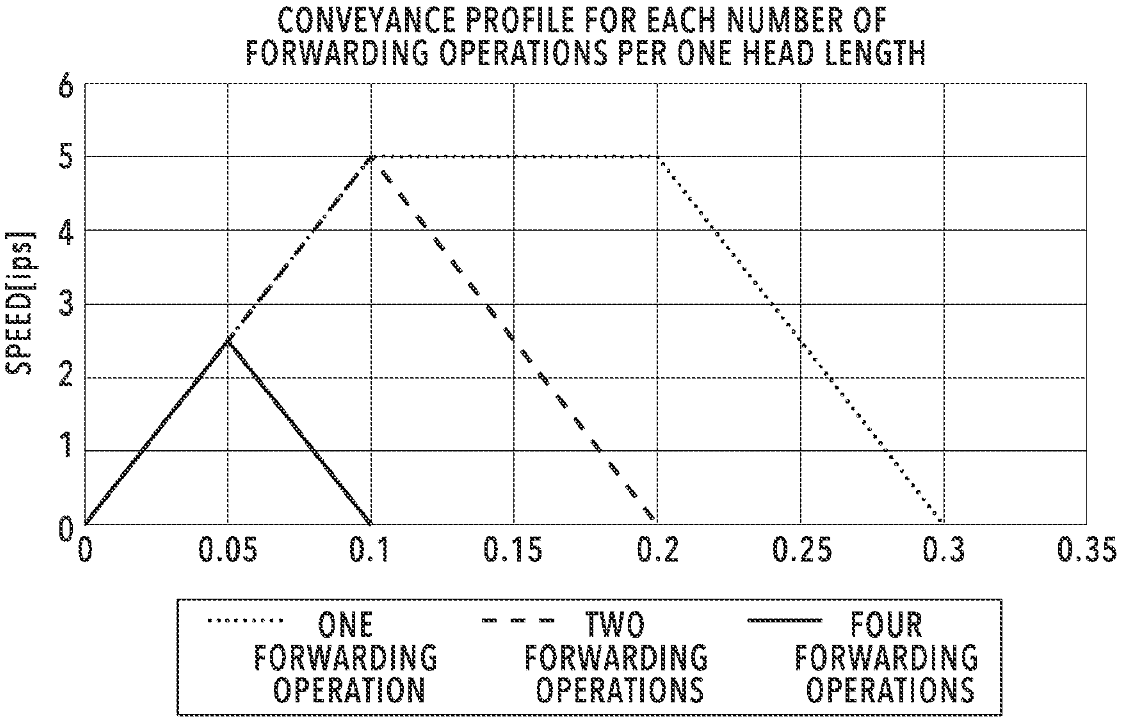
FIGS. 6A and 6B are diagrams illustrating a conveyance profile corresponding to a print mode.

FIGS. 6A and 6B are diagrams illustrating a conveyance profile corresponding to each print mode. FIG. 6A is a table illustrating the conveyance profiles, and FIG. 6B is a graph illustrating the conveyance profiles. The conveyance profiles of the conveyance roller configured to convey the printing medium are described by using FIGS. 6A and 6B.

The number of forwarding operations per one head length is determined depending on the print mode. The number of forwarding operations per one head length is equal to the number of passes referred to as so-called multi-pass. The larger the number of forwarding operations per one head length is, the higher the quality of the image to be printed is. For example, the number of forwarding operations per one head length is set to one, two, or four depending on the print mode as illustrated in FIG. 6A. Assuming that one head length is 1 inch, the conveyance amount per one forwarding operation is 1 inch, 0.5 inches, and 0.25 inches for the respective numbers of forwarding operations per one head length. Maximum speed in the conveyance is 5 ips, 5 ips, and 2.5 ips for the respective numbers, and acceleration is 50 inch/$s^2$ for all numbers. FIG. 6B illustrates a conveyance profile for each number of forwarding operations per one head length, and illustrates a graph of speed with respect to time.

A reason why differences in the conveyance profile cause a decrease in an accuracy of deformation amount measurement is described. It is known that, in the conveyance of the printing medium reeled out from the roll paper, the conveyance amount varies depending on tension applied to the printing medium. In the case where high tension is applied, minor slip occurs between the conveyance roller and the printing medium, and the conveyance amount of the printing medium decreases with respect to a rotation amount of the conveyance roller. In an acceleration region of the conveyance profile, an integrated value of acceleration and inertia of the roll paper is added to the tension applied to the printing medium, and the conveyance amount thus decreases. Moreover, also in the case where speed is high, the tension increases, and the conveyance amount decreases.

Since a proportion of the acceleration region to the entire profile varies between the one forwarding operation per one head length and the two forwarding operations per one head length, the conveyance amount varies therebetween. Moreover, since the maximum speed varies between the two forwarding operations per one head length and the four forwarding operations per one head length, the conveyance amount varies therebetween. Due to such circumstances, in the case where different conveyance profiles are used, there is a possibility that the conveyance amount varies in the deformation amount measurement, and this variation affects the deformation amount measurement accuracy.

<Flow in Fixation Temperature Determination>

Figure 7A:
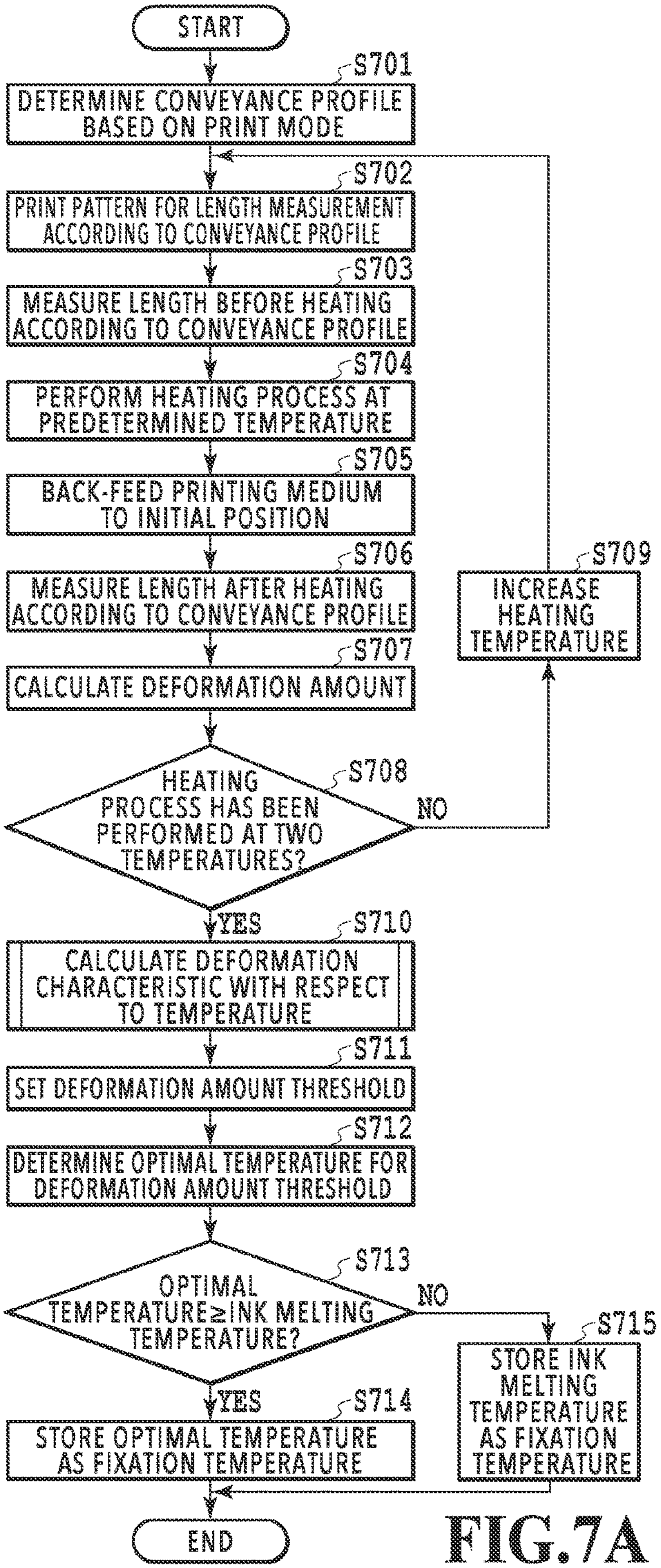
FIGS. 7A and 7B are diagrams illustrating flowcharts of a process of determining a fixation temperature of a printing medium.
Figure 7B:
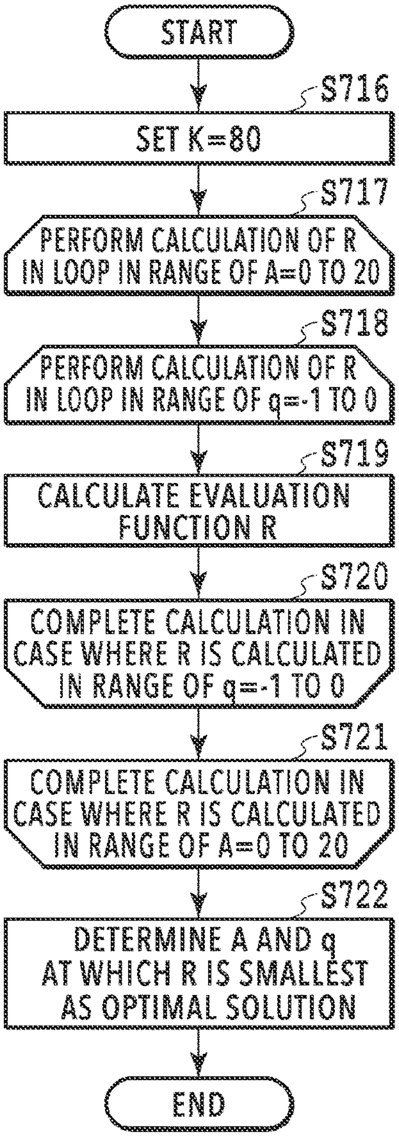

FIGS. 7A and 7B are diagrams illustrating flowcharts of a process of determining the fixation temperature of the printing medium in the present embodiment. The CPU 501 implements the process illustrated in FIGS. 7A and 7B by loading a program stored in the ROM 502 onto the RAM 503 and executing the program. Note that some or all of functions of the steps in FIGS. 7A and 7B may be implemented by hardware such as an ASIC or an electronic circuit. Sign “S” in the description of each process means step in the flowcharts of FIGS. 7A and 7B (the same applies to the following flowcharts in the present description).

In the present embodiment, description is given of an example in which accuracy of expansion-contraction measurement is improved and an optimal fixation temperature is automatically derived by the process illustrated in FIGS. 7A and 7B. The process of FIG. 7A is executed in the case where the user sets the printing medium 105 in the printing apparatus 100, and inputs an instruction of determining the fixation temperature through the input/output unit 109.

In S701, the CPU 501 determines the conveyance profile based on the print mode. For example, the print mode is set by the user through the input/output unit 109. The print mode may be set through the input/output unit 109 before the process of the flowcharts of FIGS. 7A and 7B, or may be set through the input/output unit 109 at a timing of S701 at which the flowcharts of FIGS. 7A and 7B are started. The user sets the print mode of printing to be performed by using the set printing medium 105. Note that the print mode includes various types of print settings. For example, the print settings include the type, roll diameter, paper width of the printing medium, the conveyance profile, suction pressure of the printing medium, back-tension applied to the printing medium, and the like. In S701, the conveyance profile corresponding to the set print mode is determined.

In S702, the CPU 501 prints a pattern for length measurement on the set printing medium 105 according to the conveyance profile determined in S701.

Figure 8:
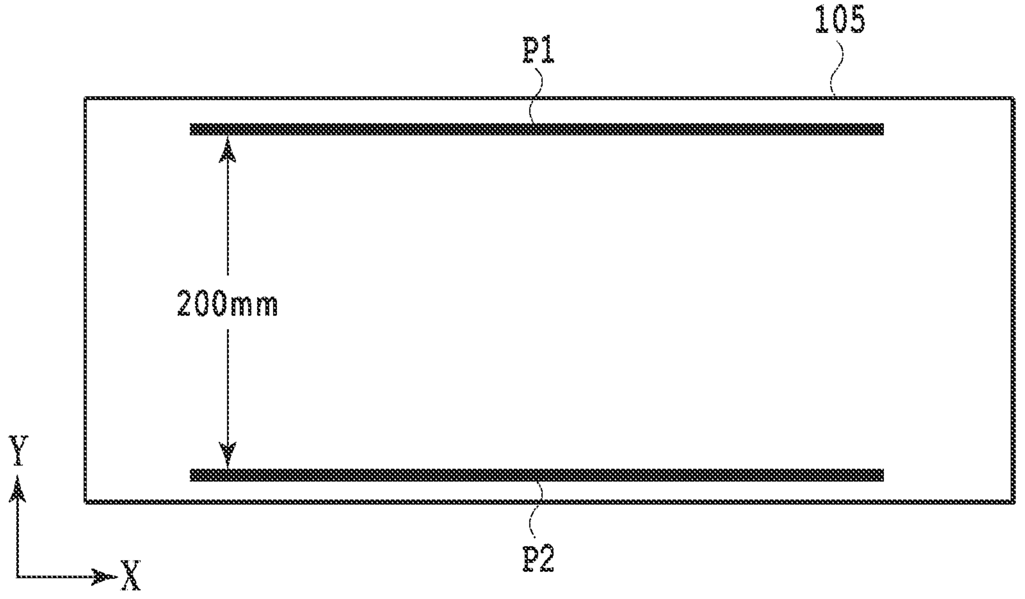
FIG. 8 is a diagram illustrating an example of a pattern for measuring a length of the printing medium.

FIG. 8 is a diagram illustrating an example of the pattern for measuring the length of the printing medium. In the present example, two patterns of a first pattern P1 and a second pattern P2 that extend in the X direction (width direction of the printing medium 105) are printed as the pattern for length measurement. These patterns are assumed to be patterns with a fixed interval length (200 mm in FIG. 8) in the Y direction (conveyance direction of the printing medium 105) of the printing apparatus 100. As described later, an inter-pattern length of the patterns with this fixed interval length is measured to calculate the deformation amount of the printing medium 105.

In S703, the CPU 501 measures the inter-pattern length before heating (first temperature) by using the optical sensor 201 in the order of printing on the printing medium 105. Specifically, the CPU 501 measures the first pattern P1 printed on the downstream side in the conveyance direction, and then measures the second pattern P2 printed on the upstream side in the conveyance direction. Note that the printing of the pattern in S702 and the length measurement in S703 are performed simultaneously in parallel according to the conveyance profile. In the measurement of the length, light is emitted from the first LED 301 at an angle of 90° in the Z direction, and reflected light from the patterns on the printing medium 105 is received at an angle of 45° in the Z direction to detect a diffuse-reflection component. The CPU 501 detects the first pattern P1 on the downstream side and the second pattern P2 on the upstream side with the optical sensor 201 while conveying the printing medium 105 in the conveyance direction (Y direction). Then, the CPU 501 obtains a conveyance amount in a period from the detection of the first pattern P1 on the downstream side to the detection of the second pattern P2 on the upstream side, from a difference between encoder positions at time points of detection of the respective patterns. Then, the CPU 501 measures the inter-pattern length from the obtained conveyance amount.

In the case where the measurement of the length before the heating is completed, in S704, the CPU 501 performs a heating process on the printing medium 105 at a predetermined temperature (second temperature). In the case where the fixation is completed by the heating process, in S705, the CPU 501 conveys (back-feeds) the printing medium in the −Y direction to a position directly below the optical sensor 201. In other words, the CPU 501 back-feeds the printing medium 105 to an initial position as in before the heating. Specifically, the CPU 501 back-feeds the printing medium 105 to the initial position as in before the heating to measure the first pattern P1 and then the second pattern P2. Next, in S706, the CPU 501 measures the inter-pattern length by conveying the printing medium 105 according to the conveyance profile determined in S701 as in before the heating. In the inter-pattern length after the heating, the conveyance amount is different due to a difference in the conveyance profile. Accordingly, in the present embodiment, the inter-pattern length of the printing medium 105 subjected to the printing and the conveyance is measured according to the conveyance profile determined in S701 to accurately measure an expansion-contraction amount after the heating. In S706, the CPU 501 measures the inter-pattern length after the heating (second temperature) as described above. Next, in S707, the CPU 501 calculates the deformation amount of the printing medium 105 from before to after the heating, with the inter-pattern length before the heating being a reference.

Next, in S708, the CPU 501 determines whether the heating process is completed at two temperatures. In the above-mentioned example, the heating process is completed at one temperature that is the second temperature. Accordingly, the determination result is NO, and the CPU 501 proceeds to S709. In S709, the CPU 501 increases the heating temperature to a third temperature. Then, the CPU 501 performs the processes of S702 and beyond again. In this case, in S703 and S706, the measurement is performed according to the conveyance profile determined in S701 as in first S703 and first S706. Moreover, in this case, in S704, the heating process is performed at the third temperature. Specifically, in second S706, the inter-pattern length after heating at the third temperature is measured, and in second S707, a deformation amount at the third temperature is calculated. Then, in S708, determination of whether the heating process is completed at two temperatures is performed again. In the case where the heating process is completed at two temperatures, the CPU 501 proceeds to S710.

In the processes up to this point, the inter-pattern lengths at three temperatures are measured. Specifically, the inter-pattern lengths at the temperature (first temperature) before the heating and at the two temperatures (second temperature and third temperature) after the heating are measured. Accordingly, the deformation amounts of the printing medium 105 at a total of three temperatures including the first temperature, the second temperature, and the third temperature are calculated. Note that, assuming that the deformation amount (S703) at the first temperature is referred to as a first deformation amount for the sake of convenience, a second deformation amount (first S707) from the first temperature to the second temperature and a third deformation amount (second S707) from the first temperature to the third temperature are calculated.

Note that, in the present embodiment, description is given assuming that the inter-pattern length of the patterns printed on the printing medium 105 is 200 mm in the example of FIG. 8. However, the inter-pattern length is not limited to this length. The longer the inter-pattern length is, the higher the calculation accuracy of the deformation amount is, but the larger the consumption of the printing medium is. Accordingly, the inter-pattern length is preferably set to an appropriate length. In the present embodiment, the target of the calculation accuracy of the deformation amount is 0.1% or less. In this case, if an accuracy of an edge detection function of the optical sensor 201 is +0.1 mm, setting the inter-pattern length of the patterns to be printed to 200 mm enables calculation of the deformation amount at an accuracy of 0.05%. Accordingly, the inter-pattern length is set to 200 mm. In any case, it is only necessary that the inter-pattern length of the printing medium 105 can be measured.

FIG. 9 is a diagram illustrating an example of the measured inter-pattern lengths and the deformation amounts obtained in the processes up to this point. An example of the calculation of the deformation amounts corresponding to the three temperatures illustrated in FIG. 9 illustrates an example in which the normal temperature (first temperatures) before the heating is 20° C., the first heating process is executed at 80° C., and the second heating process is executed at 100° C. increased by 20° C. from the temperature in the first heating process. Accordingly, in the case of FIG. 8, the deformation amounts of the printing medium 105 at 20° C., 80° C., and 100° C. are calculated at an accuracy of 0.05% with the inter-pattern length at 20° C. being the reference.

Next, in S710, the CPU 501 calculates a deformation characteristic of the printing medium 105 with respect to temperature based on the deformation amounts at the three temperatures calculated up to this point. FIG. 7B is a flowchart illustrating a detailed process of S710. The process of FIG. 7B is a process of calculating coefficients A, q, and K of Formula 1 which is an approximation of a characteristic of the deformation amount of the printing medium with respect to temperature, the printing medium being a medium that is used in the field of sign display and in which contraction due to entropic elasticity occurs in the case where the temperature exceeds the temperature referred to as the glass transition point.

$$\Delta L = q \cdot \left(\frac{\Delta T}{K}\right)^{A} \qquad \text{Formula 1}$$

In Formula 1, ΔL means the deformation amount and ΔT means an amount of change in temperature. Moreover, the coefficient A represents deformability due to temperature, and the coefficient q and the coefficient K represent the magnitude of the deformation amount due to temperature. Accordingly, the deformation characteristic of each type of printing medium with respect to temperature can be defined by using the values of the coefficients A, q, and K.

In the present embodiment, in the case where the sub-flow of S710 is started, in S716, the CPU 501 first sets K=80. This setting is made due to the following reason. The magnitude of the deformation amount is determined by a combination of the coefficient q and the coefficient K. Due to this relationship, the deformation characteristic of the printing medium 105 with respect to temperature can be calculated by using the coefficients A and q even in the case where the coefficient K is fixed to a certain value. As illustrated in S717, S718, S720, and S721, the CPU 501 executes a flow of a double loop in which an evaluation function R of Formula 2 is calculated in ranges of A=0 to 20 and q=−1 to 0. In S717, the CPU 501 changes the value of A in the range of A=0 to 20, and in S718, changes the value of q in the range q=−1 to 0 in the changing of the value of A to calculate the evaluation function R in S719. Specifically, the CPU 501 repeats the calculation of the evaluation function R in the ranges of A=0 to 20 and q=−1 to 0.

$$R = \sqrt{\frac{1}{3}\sum_{k=0}^{2}(\Delta L_k - \Delta L'_k)^2} \qquad \text{Formula (2)}$$

The evaluation function R is a root means square (RMS) of a difference between the calculation value ΔL of the deformation amount of Formula 1 and the deformation amount ΔL' calculated from the inter-pattern length in S707. The larger the value of R is, the larger the error between the deformation amount of Formula 1 and the deformation amount in S707 is. In S720 and S721, the CPU 501 calculates the evaluation function R in the range of q=−1 to 0 and A=0 to 20, and in S722, determines each of the coefficients A and q at which R is the smallest as an optimal solution. In Formula 2, the values of the above-mentioned first deformation amount ($\Delta L'_0$), the second deformation amount ($\Delta L'_1$) calculated in S707, and the third deformation amount ($\Delta L'_2$) are put into $\Delta L'_K$. Note that the first deformation amount ($\Delta L'_0$) is 0. As described above, in Formula 2, the values obtained from Formula 1 by fixing the coefficient K to a certain value and changing the coefficient A and the coefficient q are put into $\Delta L_K$. Note that 0 is put into $\Delta T$ in the case of $\Delta L_0$, 60 is put into $\Delta T$ in the case of $\Delta L_1$, and 80 is put into $\Delta T$ in the case of $\Delta L_2$ in the example described above. In the case where the coefficient A and the coefficient q are obtained in S722, the coefficient K is also obtained.

In the case where the coefficients A, q, and K are determined as described above, the deformation amount ΔL with respect to the temperature change ΔT can be calculated according to Formula 1 ($\Delta L = q \cdot (\Delta T/K)^\wedge A$). Accordingly, it is possible to calculate the deformation characteristic of the used printing medium with respect to temperature by performing the operation of S716 to S722.

Note that the process of calculating the deformation characteristic of the printing medium with respect to temperature described above is merely an example, and the process is not limited to this example. The method of deriving the deformation characteristic of the printing medium with respect to temperature and the initial values and the ranges in the deriving are not limited to those in the above example. The deformation characteristic may be derived by using a different formula or by applying a different algorithm. In any case, it is only necessary to find out the deformation characteristic of each type of printing medium with respect to temperature.

In the case where the process of S710 is completed, in S711, the CPU 501 sets a deformation amount threshold. The deformation amount threshold in the present embodiment is a threshold for calculating an optimal temperature at which the deformation amount of the printing medium 105 is suppressed, and the present embodiment is configured such that the user can select a desired threshold as the deformation amount threshold. The configuration may be such that, in S711, the CPU 501 sets the deformation amount threshold already specified by the user before the process of the flowcharts of FIGS. 7A and 7B, or a screen configured to receive specification by the user to be described later is displayed at a point of S711.

FIGS. 10A to 10H are diagrams illustrating examples in which the deformation amount threshold can be selected. As illustrated in FIGS. 10A, 10B, 10D, and 10F to 10H, the configuration may be such that the user can select the deformation amount threshold by specifying the deformation amount threshold in, for example, a user interface (UI) screen. The UI screen is displayed on the input/output unit 109. Moreover, as illustrated in FIGS. 10C and 10E, the configuration may be such that deformation amount thresholds corresponding to specified items are stored in a table, and the deformation amount thresholds can be selected depending on the specified items.

For example, as illustrated in FIG. 10A, the configuration may be such that the user specifies and inputs a desired deformation amount threshold of a newly-added printing medium by using the input/output unit 109. As illustrated in FIG. 10B, the configuration may be such that the CPU 501 sets a deformation amount threshold selected by the user from a pull-down menu from among multiple candidates of the deformation amount threshold (expansion-contraction allowable value) defined in advance. As illustrated in FIG. 10C, the CPU 501 may set a deformation amount threshold stored in advance in the EEPROM 504 for each type of printing medium. As illustrated in FIGS. 10D and 10E, the CPU 501 may set a deformation amount threshold defined in advance based on a print mode selected from a pull-down menu. For example, in a dimension prioritized mode, the deformation amount threshold is set to 0.1% in which the deformation amount is small. As a result, heating fixation is performed for a long time at a low temperature to reduce the deformation amount. Meanwhile, a productivity prioritized mode is a mode in which heating fixation is performed in a short time at a high temperature to improve productivity. A deformation amount threshold is set to 0.3% in which the deformation amount is large to allow setting of a high temperature.

Moreover, as illustrated in FIGS. 10F, 10G, and 10H, the configuration may be such that the user can select which one of the setting of the deformation amount threshold based on the medium type, the setting of the deformation amount threshold based on the print mode, and the setting of the deformation amount threshold by the user setting is to be performed. Then, the CPU 501 may set the deformation amount threshold corresponding to the item specified as enabled by the user. Note that the examples illustrated in FIGS. 10A to 10H are merely examples, and the present disclosure is not limited to these examples. The present disclosure only needs to include a receiving unit capable of receiving the desired deformation amount threshold by user specification. Note that, although the example in which the user can specify the desired deformation amount threshold is described in this description, the present disclosure is not limited to this. A fixed deformation amount threshold may be used. The deformation amount threshold set in S711 is stored in the EEPROM 504.

In S712, the CPU 501 determines the optimal temperature for the deformation amount threshold set in S711 based on the deformation characteristic calculated in S710.

Figure 11:
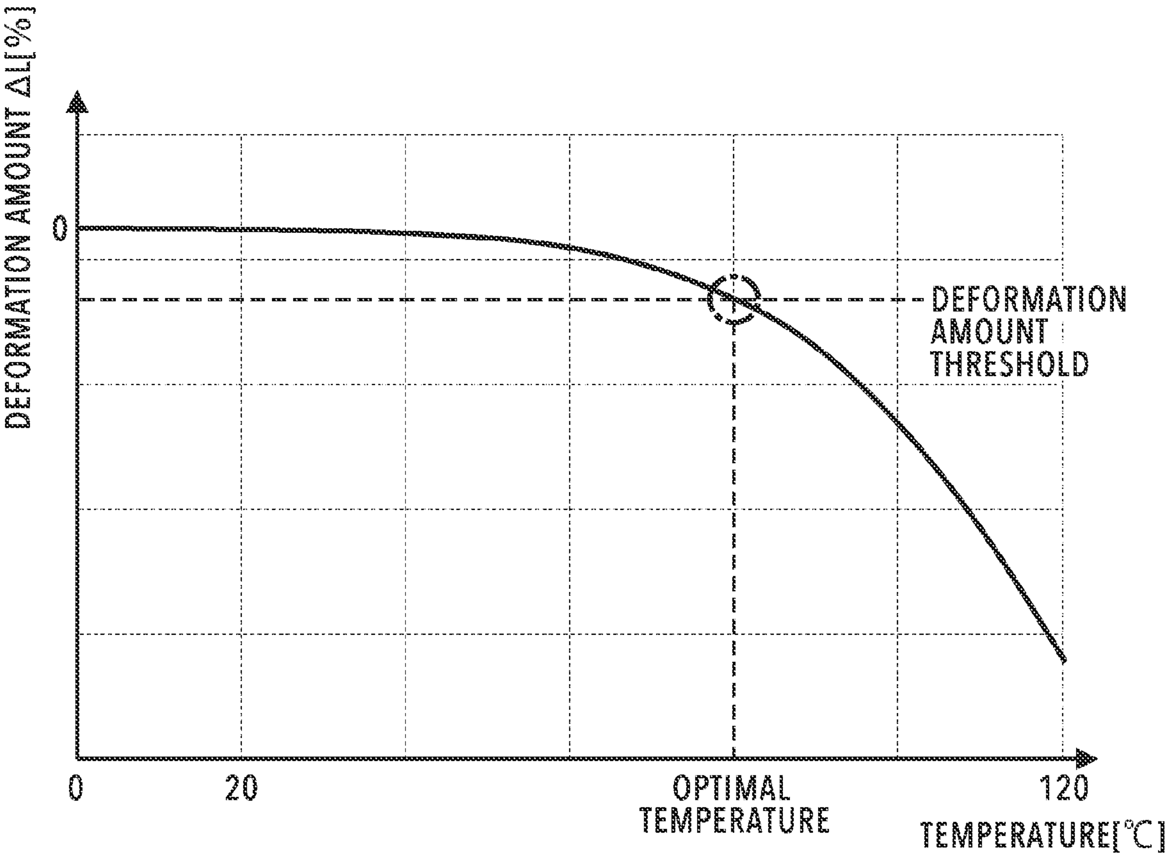
FIG. 11 is a diagram illustrating a relationship between the deformation amount threshold and an optimal temperature.

FIG. 11 is a diagram illustrating a relationship between the deformation amount threshold and the optimal temperature. The graph in FIG. 11 illustrates the deformation characteristic of the printing medium with respect to temperature calculated in S710. As illustrated in FIG. 11, in S712, a maximum temperature at which the deformation characteristic does not exceed the deformation amount threshold read from the EEPROM 504 is determined (calculated) as the optimal temperature.

Next, in S713, the CPU 501 compares the optimal temperature determined in S712 with an ink melting temperature. The ink melting temperature is a minimum temperature at which the latex resin contained in the latex ink used in the present embodiment melts, and is assumed to be 60° C. in the present embodiment. In the case where the CPU 501 determines that the optimal temperature determined based on the deformation amount threshold is equal to or higher than the ink melting temperature, the CPU 501 proceeds to S714. In S714, the CPU 501 determines the optimal temperature determined in S712 and corresponding to the conveyance profile in the print mode set by the user as the fixation temperature, and stores the optimal temperature in the EEPROM 504. Then, the CPU 501 terminates the process of the flowcharts of FIGS. 7A and 7B. Meanwhile, in the case where the CPU 501 determines that the optimal temperature determined based on the deformation amount threshold is lower than the ink melting temperature, the CPU 501 proceeds to S715. In S715, the CPU 501 determines the ink melting temperature of 60° C. as the fixation temperature, and stores the ink melting temperature in the EEPROM 504. Then, the CPU 501 terminates the process of the flowcharts of FIGS. 7A and 7B.

As described above, according to the present embodiment, the optimal fixation temperature can be determined. Specifically, in the present embodiment, in the measurement of the deformation amounts before and after the heating, the measurement is performed by using the same conveyance profile. This can improve the deformation amount measurement accuracy, and enables determination of a more-optimal fixation temperature. Note that the configuration may be such that the suction pressure of the printing medium and the back-tension applied to the printing medium that correspond to the print mode and that relate to conveyance accuracy may also be set to the same suction pressure and the same back-tension in the measurement of the deformation amounts.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-203304, filed Dec. 20, 2022 which is hereby incorporated by reference wherein in its entirety.

What is claimed is:

1. A printing apparatus comprising:

a printing unit configured to print an image onto a printing medium;

a first determining unit configured to determine a conveyance profile corresponding to a print mode;

a conveying unit configured to convey the printing medium on which the image was printed, according to the conveyance profile;

a fixing unit configured to fix the image onto the printing medium by heating the printing medium;

a measuring unit configured to measure each of a length of the printing medium before heating in the fixing unit and a length of the printing medium after the heating in the fixing unit by detecting the image on the printing medium conveyed according to the conveyance profile;

a deriving unit configured to derive a characteristic of a deformation amount of the printing medium with respect to temperature based on the measured lengths; and a second determining unit configured to determine a fixation temperature to be used for the printing medium based on the derived characteristic of the deformation amount of the printing medium.

2. The printing apparatus according to claim 1, wherein the conveying unit is configured to convey the printing medium by repeatedly conveying the printing medium for a predetermined distance and then stopping, and wherein the conveyance profile includes information on the predetermined distance.

3. The printing apparatus according to claim 2, wherein the printing mode includes a first printing mode in a case of the printing medium being a first type and a second printing mode in a case of the printing medium being a second type, and wherein the first determining unit is configured to determine the conveyance profile to be a first conveyance profile in a case where the printing mode is the first printing mode, and to determine the conveyance profile to be a second conveyance profile in a case where the printing mode is the second printing mode, the second conveyance profile including information on the predetermined distance different from the first conveyance profile.

4. The printing apparatus according to claim 1, wherein the image is a pattern having a predetermined length on the printing medium, and the measuring unit measures the length of the pattern printed on the printing medium by measuring reflected light of the pattern, and thereby measures the lengths of the printing medium.

5. The printing apparatus according to claim 4, wherein the pattern includes a first pattern and a second pattern, wherein a predetermined interval is provided between the first pattern and the second pattern, and wherein the measuring unit measures the first pattern and the second pattern in this order in a case where the printing unit prints the first pattern and then the second pattern.

6. The printing apparatus according to claim 1, further comprising a receiving unit configured to receive specification of a desired deformation amount threshold, wherein the second determining unit determines the fixation temperature to be used for the printing medium based on the derived characteristic of the deformation amount of the printing medium and the desired deformation amount threshold.

7. The printing apparatus according to claim 6, wherein the receiving unit receives an input of the deformation amount threshold by a user.

8. The printing apparatus according to claim 6, wherein the receiving unit receives the specification of the deformation amount threshold selected by a user from among a plurality of candidates of the deformation amount thresholds set in advance.

9. The printing apparatus according to claim 6, wherein the receiving unit receives specification of a type of the printing medium, and the deformation amount threshold varies depending on the type of the printing medium.

10. The printing apparatus according to claim 6, wherein the receiving unit receives selection of the print mode, and the deformation amount threshold varies depending on the print mode.

11. The printing apparatus according to claim 6, wherein the receiving unit determines the deformation amount threshold corresponding to an item that is specified as enabled from among an item in which an input of the deformation amount threshold by a user is receivable, an item in which specification of a type of the printing medium is receivable, and an item in which selection of the print mode is receivable.

12. The printing apparatus according to claim 6, wherein the receiving unit receives the specification of the desired deformation amount threshold through a screen for receiving the specification.

13. The printing apparatus according to claim 1, wherein the second determining unit determines the fixation temperature such that the fixation temperature is equal to or higher than a melting temperature of ink used in printing.

14. The printing apparatus according to claim 1, wherein the deriving unit derives the deformation amount of the printing medium at each of three temperatures including: a first temperature before the heating, and a second temperature and a third temperature after the heating.

15. A control method of a printing apparatus including a printing unit configured to print an image onto a printing medium, a conveying unit configured to convey the printing medium on which the image was printed, according to a conveyance profile, a fixing unit configured to fix the image onto the printing medium by heating the printing medium, and a measuring unit configured to measure each of a length of the printing medium before heating in the fixing unit and a length of the printing medium after the heating in the fixing unit by detecting the image on the printing medium conveyed according to the conveyance profile, the control method comprising:

determining the conveyance profile to be used in the conveying unit depending on a print mode;

deriving a characteristic of a deformation amount of the printing medium with respect to temperature based on the lengths measured in the measuring unit by using the conveyance profile; and determining a fixation temperature to be used for the printing medium based on the derived characteristic of the deformation amount of the printing medium.

* * * * *